Jan. 2, 1940.   E. C. HORSLEY   2,185,633
SIGHTING APPARATUS FOR USE ON AIRCRAFT
Filed Feb. 10, 1939   11 Sheets-Sheet 1
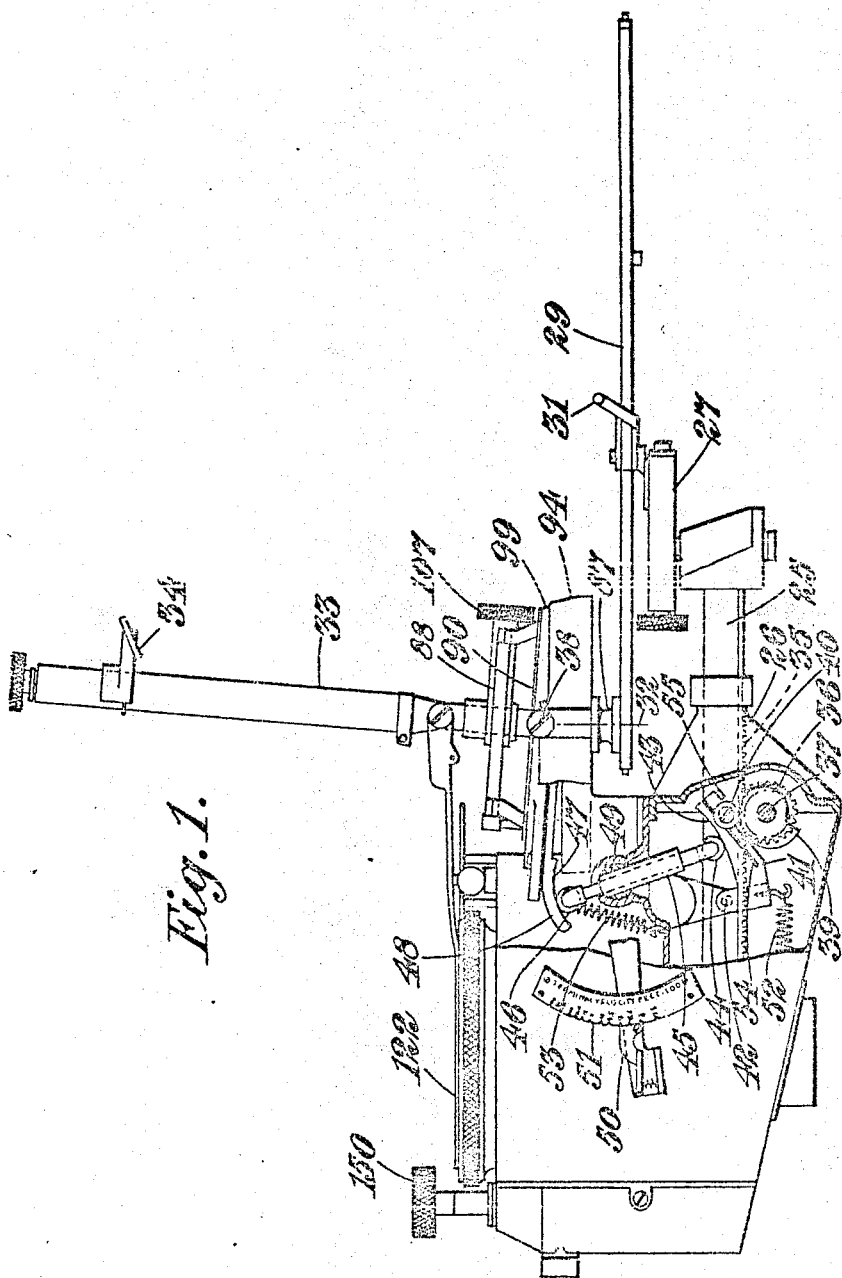

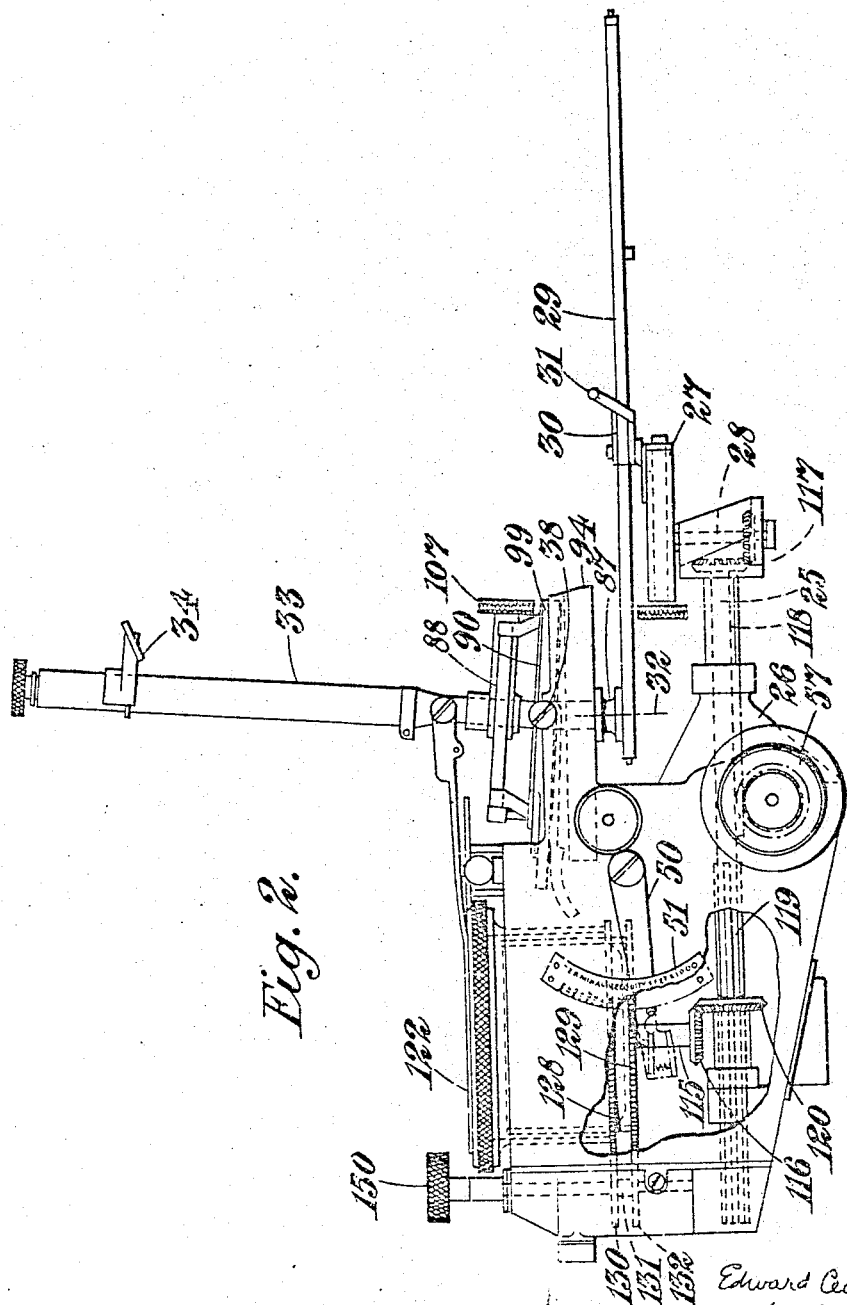

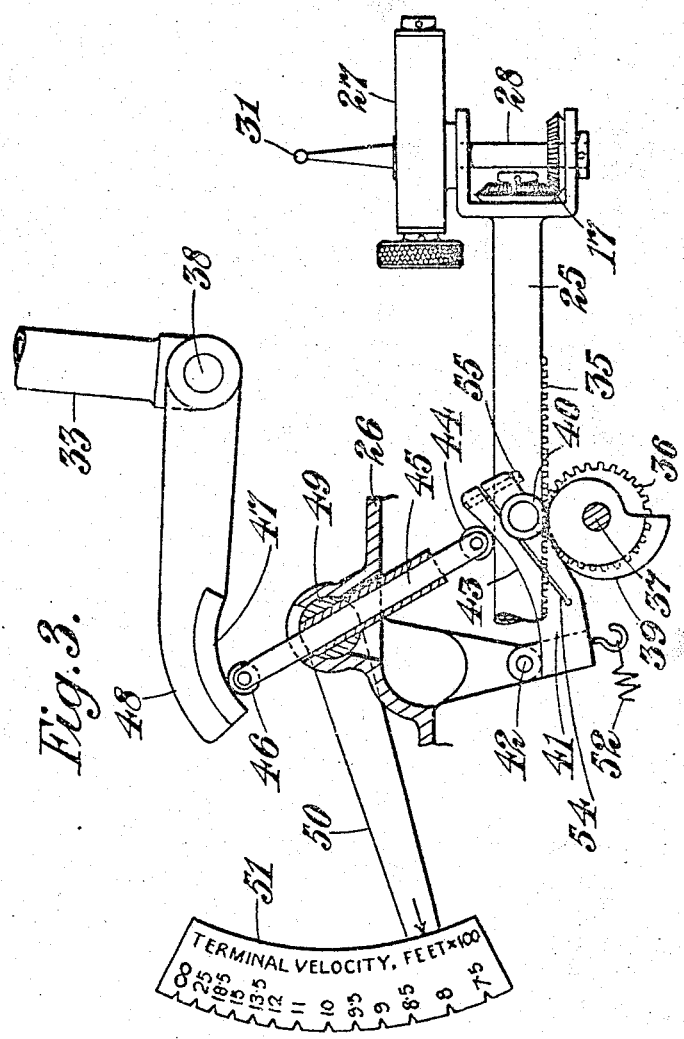

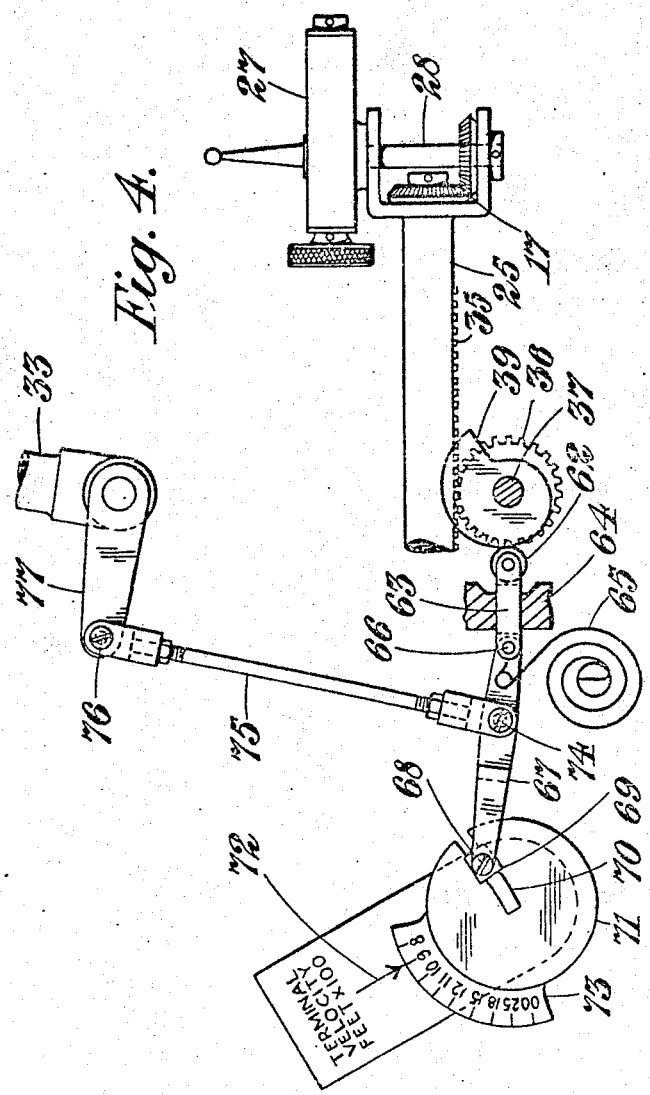

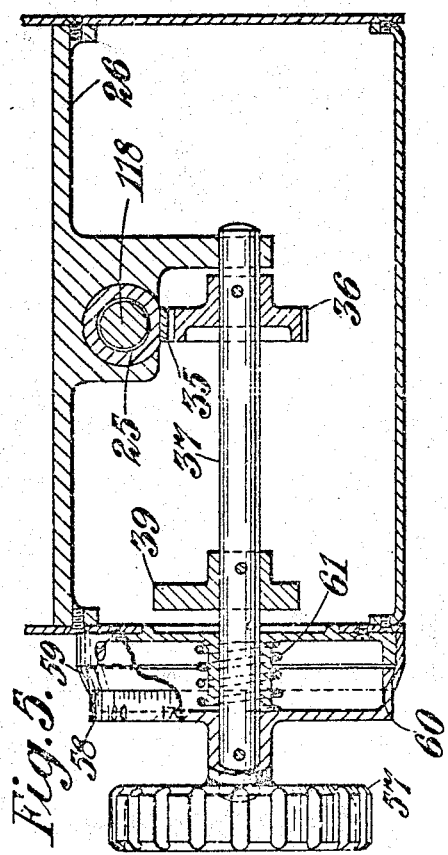

Jan. 2, 1940.  E. C. HORSLEY  2,185,633
SIGHTING APPARATUS FOR USE ON AIRCRAFT
Filed Feb. 10, 1939   11 Sheets-Sheet 6
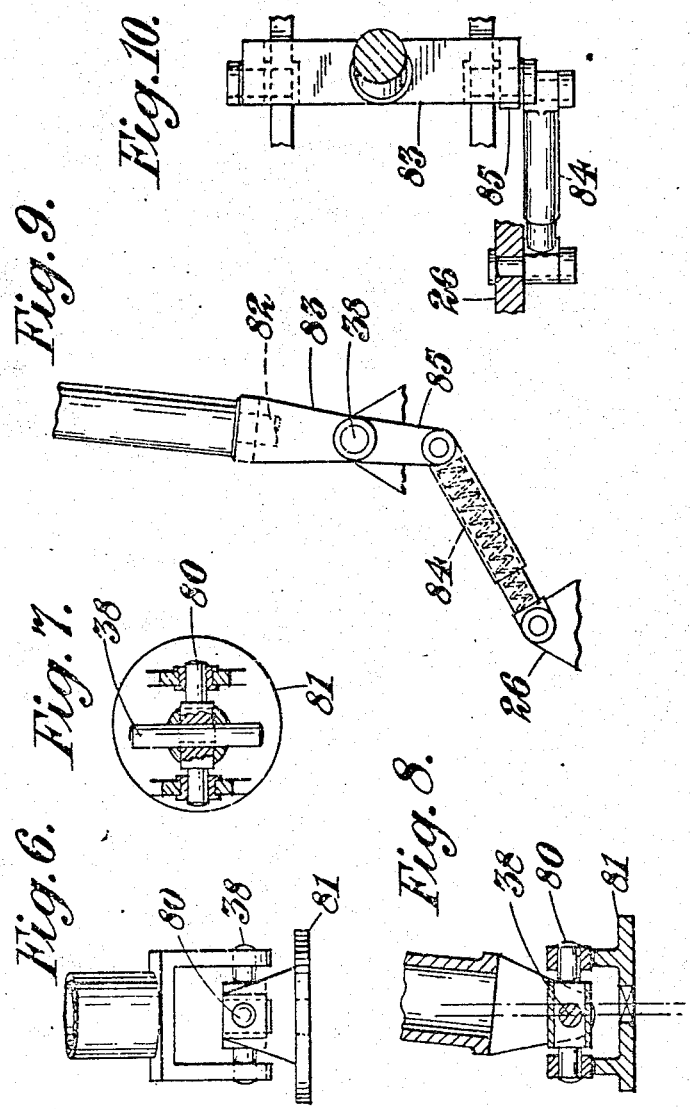
Edward Cecil Horsley
by his attys.
Stebbins, Blenko & Parmelee Jan. 2, 1940.  E. C. HORSLEY  2,185,633
SIGHTING APPARATUS FOR USE ON AIRCRAFT
Filed Feb. 10, 1939   11 Sheets-Sheet 8

Jan. 2, 1940.   E. C. HORSLEY   2,185,633
SIGHTING APPARATUS FOR USE ON AIRCRAFT
Filed Feb. 10, 1939   11 Sheets-Sheet 9
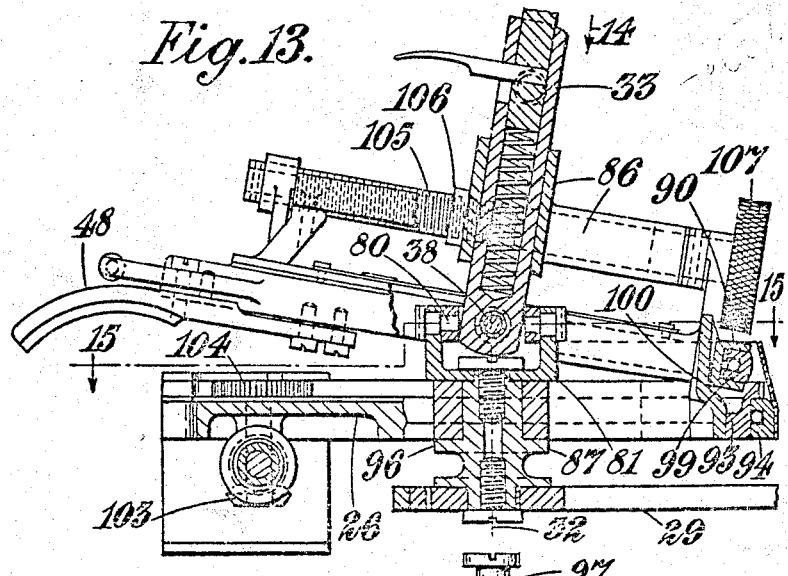
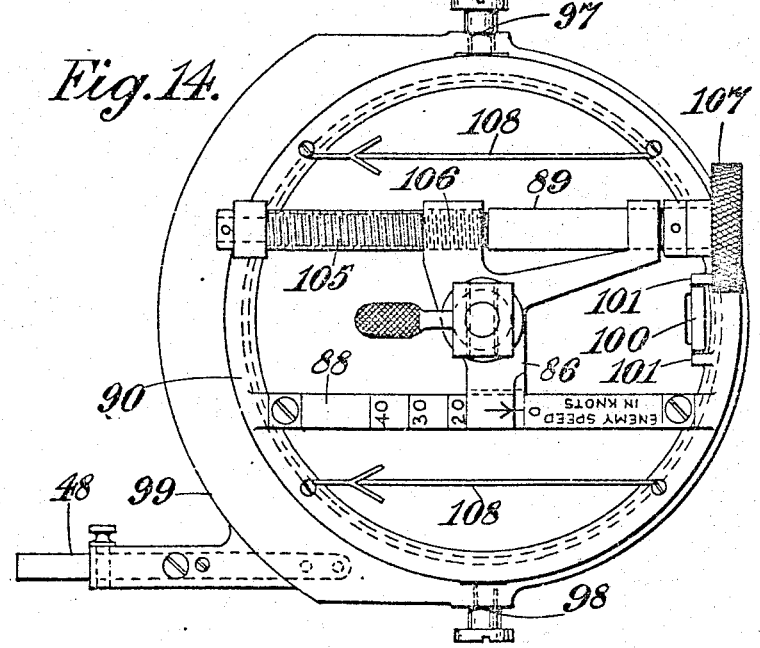
Edward Cecil Horsley
by his attys.
Stebbins, Blenko & Parmelee

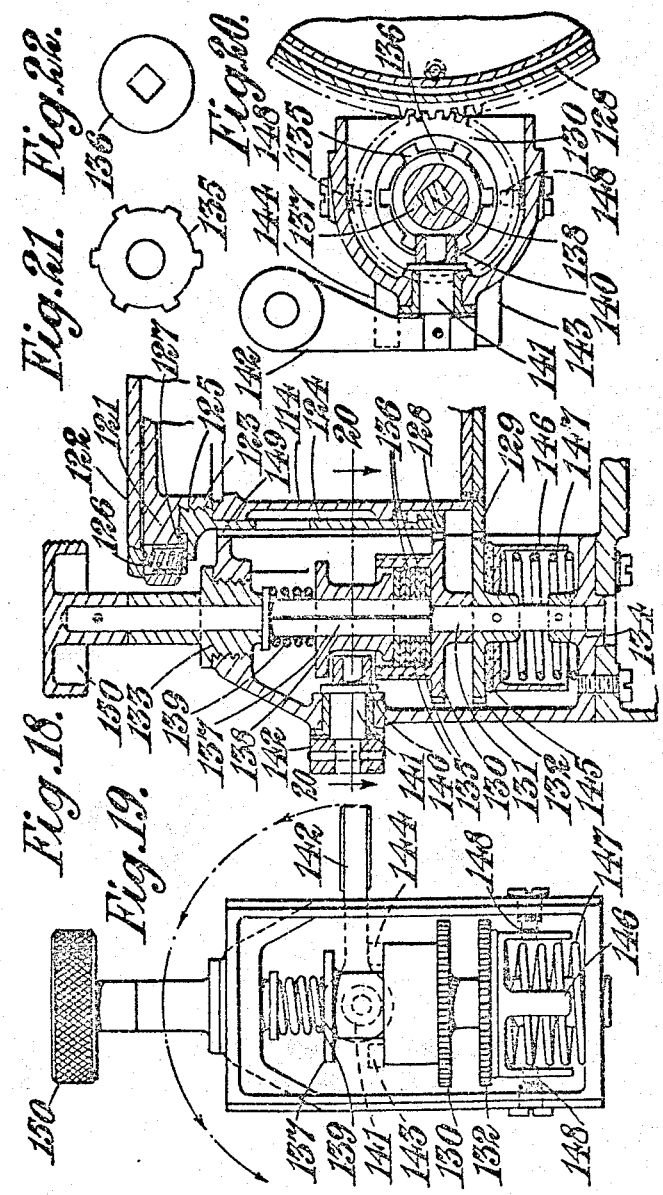

Patented Jan. 2, 1940

2,185,633

UNITED STATES PATENT OFFICE

2,185,633

SIGHTING APPARATUS FOR USE ON AIRCRAFT

Edward Cecil Horsley, London, England

Application February 10, 1939, Serial No. 255,672
In Great Britain April 8, 1929

19 Claims. (Cl. 33—46.5)

This application corresponds to the secret patents of Edward Cecil Horsley, Serial No. 10803/29, Serial No. 11366/29 and Serial No. 35515/30, which were filed in Great Britain on April 8, 1929, April 12, 1929 and November 26, 1930, respectively.

This invention relates to sighting apparatus for use on aircraft. The invention is concerned with bomb sights of the type comprising adjustable members representing the vector quantities of air speed, i. e., the speed of the bomb sight relative to the surrounding air, wind speed, i. e., the speed of the air relative to the ground and ground speed, i. e., the relative speed between the bomb sight and the ground.

Generally, such a bomb sight comprises an air speed member, a wind member and a drift member which are pivotally connected together and are adjustable in length and which are furthermore arranged horizontally, together with a rear sight adjustable on an upstanding altitude member, and a fore sight.

In addition, there is provided a compass having its bowl geared to the wind member so that a wind arrow (attached to the bowl and pointing in the down wind direction) is kept parallel to the wind bar, a bearing plate (e. g., a verge ring) which is mounted at the top of the bowl and can be locked to the bowl for rotation therewith or can be freed for rotation independently of the bowl and the wind arrow, this bearing plate being garduated from nought to 360° and showing the points of the compass. In addition, there is an air speed bar pointer or lubber mark (vertically above the axis of the air speed bar), a drift bar pointer (which moves with the drift bar) reading against the bearing plate and a drift scale and wind gauge bar hinged to the altitude bar. The air speed bar pointer is marked on the drift scale which is graduated up to 45° on each side of zero for reading the drift angle and is carried on the bomb sight frame. The wind bar gauge can be folded down over a glass covering the bearing plate and is used to determine the wind elements, it being arranged to move in line with the drift bar.

According to one feature of the present invention there is provided a bomb sight comprising the relatively adjustable members representing the vector quantities of air speed, wind speed and drift for determining the sighting line, characterized by means automatically to effect a correction of the sighting line for the trail angle of a bomb when the air speed member is adjusted for air speed. Furthermore, means is conveniently provided for effecting a trail angle correction of the sighting line for bombs of different terminal velocities.

According to a further feature of the invention, the correction for trail angle is applied to an upstanding altitude member or to a back sight thereon. Preferably, this correction is obtained by a coupling between the altitude member and the air speed member such that the former moves according to a function of the trail angle and air speed. The means for adjusting the correction for bombs having different terminal velocities is conveniently arranged to vary this coupling.

According to another feature of the invention, the altitude member aforesaid is pivotally mounted in a position displaced from the origin or trail point of the bomb sight. In this manner a correction for trail angle as aforesaid may be arranged to hold good for various adjustments of the back sight on the altitude member. Alternatively, for this purpose, the altitude member is so shaped that the correction for trail angle is maintained for adjustment of the back sight on the altitude member.

For the adjustment of the air speed member there is conveniently provided a handle with which there is associated a friction brake releasable by the hand wheel for normally locking the air speed member in the adjusted position.

Yet another feature of the invention consists in the provision in a bomb sight as aforesaid of an additional adjustable member representing target speed (i. e., the speed of the target relatively to the ground). This target speed member is conveniently pivoted at one of the connections between the air speed member, the wind member and the drift member, and in the preferred construction is pivoted to the drift member at a part displaced from the connection of the drift member to the wind member.

According to a further feature of the invention the altitude member with the back sight thereon is coupled to the drift member so as to be rotatable therewith about a vertical axis which is laterally movable with respect to the bomb sight base. The altitude member is pivotally mounted for movement in the vertical plane of the air speed member, and in the preferred construction is connected to the drift member by means of a universal joint. In the preferred construction the altitude construction is furthermore rotatably mounted on a slider movable along the target speed member and this latter member conveniently comprises upper and lower parts, wh'ch upper part is tiltable with respect to the lower part on the bomb sight frame and the slider which carries the altitude member comprises two parts movable respectively on the upper and lower parts of the target speed member. The two parts of the target speed member may be interconnected for joint rotation with the upper part rotatably carried in a tiltable frame.

A further feature of the invention consists of a bomb sight as aforesaid having a compass with its bowl rotatably mounted and geared to the wind member and a bearing plate rotatable at the top of the bowl, wherein the bearing plate and the bowl are each provided with a toothed gear, one of which meshes with a pinion fast on a rotatable adjusting shaft and the other with a second pinion connected to said shaft through a disengageable clutch.

The invention will now be further described with reference to specific embodiments and illustrated by way of example in the accompanying drawings, in which:—

Figure 1 is a general arrangement side elevation of a course setting bomb sight incorporating one form of the present invention, parts being broken away or omitted to show the mechanism for the correction of trail angle;

Figure 2 is a similar view to Figure 1 with other parts broken away to show the compass bowl mechanism;

Figure 3 is a diagrammatic view of mechanism shown in Figure 1;

Figure 4 is a view similar to Figure 3 showing a modification;

Figure 5 is a sectional elevation of a constructional detail;

Figures 6, 7 and 8 are respectively a front elevation, a sectional elevation at right-angles thereto and a sectional plan of a constructional detail;

Figures 9 and 10 are respectively a sectional elevation and a sectional plan of another detail;

Figure 13 is a sectional elevation showing details of the mounting of the target speed member and altitude member, the section being taken on line 13—13 of Figure 15;

Figure 14 is a plan of the upper part of the mechanism shown in Figure 13;

Figure 18 is a sectional elevation of part of the bomb sight showing means for the adjustment of the compass bowl and bearing plate;

Figure 19 is an elevation of the adjusting means looking from the right in Figure 18, the bearing plate and compass bowl being removed;

Figure 20 is a section on line 20—20 of Figure 18, and

Figures 21 and 22 show details.

Like references indicate like parts throughout the figures of the drawings.

Figure 11:
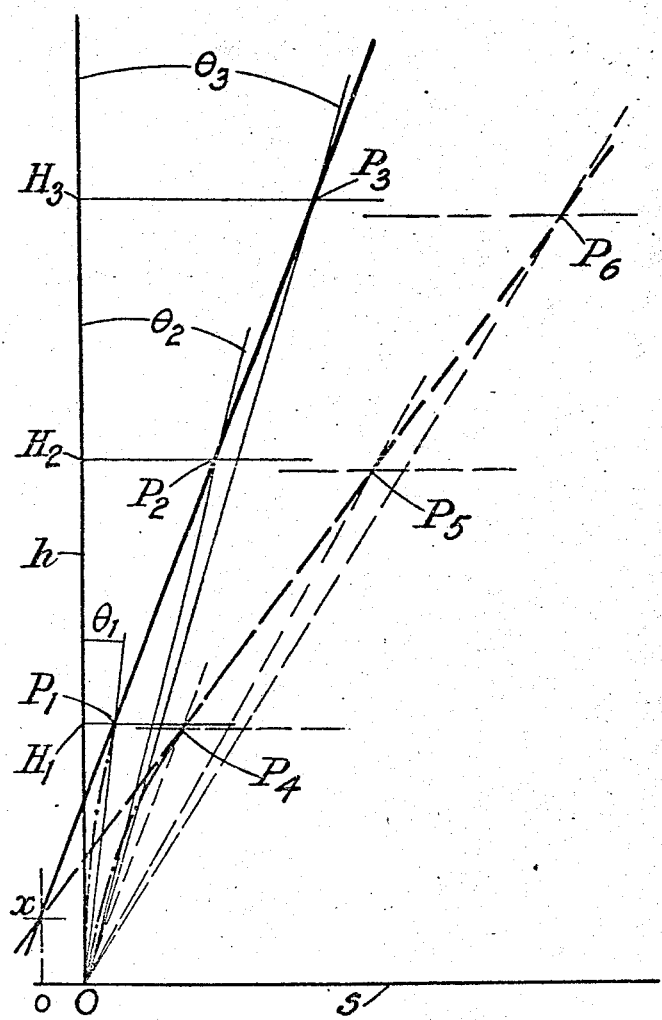
Figure 11 is a diagram showing how the pivot position of the altitude member is obtained.

Referring more especially to Figures 1 and 2 of the drawings, the bomb sight comprises an air speed bar 25 adjustable lengthwise in the frame of the bomb sight indicated at 26, a wind bar 27 which is also adjustable in length and is provided with a spindle 28 by means of which it is rotatably mounted in the air speed bar, a drift bar 29 slidable in a block 30 pivoted on the wind bar 27, a fore sight being provided as indicated at 31. The drift bar 29 is pivotally mounted about the axis 32 on the bomb sight frame. An altitude bar 33 with an adjustable back sight 34 thereon is pivotally mounted at 38.

The air speed bar 25 is provided with a rack 35 which is engaged by means of a pinion 36 fast on a transverse spindle 37 rotatably mounted in the bomb sight frame. A cam 39 is mounted on this spindle and the contour of this cam is calculated according to a law or function correlating trail angle and air speed and is arranged to apply a correction for the trail angle to the altitude bar by tilting it in a fore and aft plane. The correlation between trail angle and air speed is determined from ballistic tables computed from actual experiments in which bombs are dropped and measurements taken. The arrangement is such that as the air speed bar 25 is adjusted lengthwise for air speed the cam operating through a transmission mechanism (hereinafter described) tilts the altitude bar about its pivotal mounting to give a correction for trail angle dependent on the air speed. The transmission mechanism between the cam and the altitude bar is adjustable to enable the correction to be adjusted for bombs having different terminal velocities.

Referring to Figures 1 and 3, the cam 39 is engaged with a roller 40 mounted at one end of a block 41 which is pivotally mounted at its other end at 42 on the bomb sight frame. The block 41 is formed with a curved surface 43 which is engaged by a roller 44 at the lower end of a link 45 which at its upper end carries a roller 46 engaging a curved surface 47 of an arm 48 which is connected to the altitude bar 33.

The link 45 slides in a drum 49 rotatably mounted in the bomb sight frame and this drum carries an index 50 registering with a terminal velocity scale 51 fixed on the bomb sight frame to enable the link to be set at different inclinations for bombs having different terminal velocities. Springs 52 and 53 are provided for keeping the rollers 44 and 46 in contact with the curved surfaces 43 and 47 respectively. The block 41 is split at 54 and the two parts are adjustable towards and away from one another by means of a set screw 55.

A hand wheel 57 (see Fig. 5) is mounted on the spindle 37 and has an air speed scale 58 cooperating with an index on a fixed rim 59 on the bomb sight frame. That part of the handle carrying the scale has a conical surface 60 engaging with the inner surface of the rim 59 under the action of a spring 61 so that the spindle 37 is frictionally held in position. When it is desired to adjust the air speed bar to a new position the hand wheel 57 is pressed inwardly to disengage the surface 60 from the rim 59 and is then turned as required. The axial movement of the hand wheel may be accommodated by allowing for a small axial movement of the hand wheel on the spindle 37 or by allowing for a small axial movement of this spindle in the bomb sight frame. The rotary drum 49 for adjusting the transmission mechanism for bombs of different terminal velocities may be associated with a second hand wheel and a second friction brake operating in a similar manner to that described for adjusting the air speed scale, or with a jaw or other type of clutch.

The operation of the arrangement just described is as follows: With the adjustment of the air speed bar the cam 39 assumes a definite position for each particular air speed setting and therefore the angular motion of the block 41 about its fulcrum is thereby controlled by the air speed setting. Inclination of the drum 49 according to terminal velocity of the bomb determines the position of the lower roller 44 on the curved surface 43. The combined motions control the total movement of the link 45 for operating the altitude bar 33. Once the drum 49 is set according to the terminal velocity of the particular bomb used then variation of the setting of the air speed bar determines the correct inclination of the altitude bar. The arrangement is such that when the terminal velocity is set to infinity the lower roller 44 becomes coaxial with the pivot 42 and the altitude bar becomes vertical. Any air speed setting then results in no movement of the altitude bar. Also, assuming the air speed is set to zero the block 41 has a neutral position with the curved surface concentric with the axis of the drum 49, and the altitude bar is vertical for any position of the roller 44, that is, for any terminal velocity setting.

In the modified arrangement shown in Figure 4 the cam 39 is engaged by a roller 62 mounted at one end of a slide block 63, which is mounted in a guide 64 in the bomb sight frame and is pressed towards the cam 39 by means of a spring 65 anchored on the bomb sight frame. The other end of the slide block 63 is pivotally connected at 66 to one end of a link 67, the other end of which is pivotally connected at 68 to a slide block 69 movable in a slot 70 in a rotatable disc 71. The slot 70 is curved and the general direction of the slot can be adjusted by rotating the disc 71 by hand. An index 72 fixed on the bomb sight frame is arranged to register with a terminal velocity scale 73 on the disc 71 to enable the slot 70 to be set for bombs having different terminal velocities. The link 67 is pivotally connected between its ends, at 74, to the lower end of another link 75 of which the upper end is pivotally connected at 76 to a crank 77 fast to the altitude bar 33. In the operation of this arrangement, when the air speed bar is adjusted, for instance, by a hand wheel, as in the preceding construction, the cam 39 being rotated, assumes a definite position for each air speed setting, and therefore the slide block 63 also has a definite position according to this setting and determines the position of the pivot 66. The position of the pivot 68 is controlled by the inclination of the curved slot 70 according to the terminal velocity. The combined adjustments control the movement of the link 75 which correspondingly alters the inclination of the altitude bar.

The terminal velocity disc 71 is set to the terminal velocity of the particular bomb to be used, and when once set, varying settings of the air speed determine the correct inclination of the altitude bar. The arrangement is such that, when the terminal velocity is set to infinity, the curved slot 70 becomes approximately neutral and the altitude bar becomes vertical. In this setting, movement of the cam imparts no vertical component to the altitude bar crank, and the altitude bar remains in a vertical position. The arrangement is also such that for any terminal velocity setting, assuming the air speed is set to zero, the slide block 69 moves to the centre of the disc 70. In this setting, the link 67 comes into a neutral position and the altitude bar becomes vertical.

In obtaining compensation for trail angle for varying altitude settings according to the present invention, advantage is taken of the discovery that if, as shown in Figure 11, trail angles $\theta 1$, $\theta 2$, $\theta 3$ for the same air speed and for different heights, say above 2,500 feet, are plotted in relation to a common trail point O, a fair straight line P1—P2—P3, can be drawn through the intersection of the trail angle lines with the horizontal height lines, and the fair straight line, if produced, intersects the zero height line at a small distance O—o behind the trail point O.

Therefore, instead of pivoting the altitude bar at the trail point or the crossing of the axes of the air speed bar and the drift bar, or in other words, the zero point for the air speed, ground speed and altitude speed scales, according to the present invention the altitude bar is pivoted a short distance behind, above, below or in front of the trail point, for example at a false trail point $x$.

In ascertaining the point $x$, a number of different heights (say, three) $h1$, $h2$, $h3$, are chosen and distances O—H1, O—H2, O—H3 are set up on the altitude bar (which is diagrammatically shown at $h$) =

$$\frac{h1}{T1+t1}, \frac{h2}{T2+t2}, \frac{h3}{T3+t3}$$

respectively, where $T$ = the time of fall of the bomb in a vacuum and $t$ = the time lag (i. e. the difference between the actual time of fall and the time of fall in a vacuum). Some convenient air speed $v$ is then chosen, and angles $\theta 1$, $\theta 2$, $\theta 3$ are set out equal to the trail angles (i. e. the angle by which the bomb as viewed from a uniformly moving aircraft appears to trail behind the vertical) for the heights $h1$, $h2$, $h3$ and the air speed $v$. Horizontal lines are drawn through H1, H2, H3 intersecting the inclined lines at P1, P2, P3. For heights above 2,500 feet these points fall upon an approximately straight line, which if produced meets the air speed bar (which is diagrammatically shown at $s$) at a point behind the trail point O.

Similarly, for some greater air speed $v$ points P4, P5, P6 may be found which lie on an approximately straight line which if produced intersects the line P1—P2—P3 at a point near the trail point O. Other lines found for other air speeds also meet at or near a common point which may be on or above or below the air speed bar and on or in front of or behind a vertical line through the trail point.

By hinging the altitude bar at its common point, the conditions for accuracy are satisfied and a straight altitude bar may be used instead of a curved one. The altitude bar in this case is set up at the false trail point, but the sighting points (i. e. the back sight and the fore sight) for any height above 2,500 feet form with the trail point O and the air speed bar 25 the true trail angle, as $\theta 1$, $\theta 2$, $\theta 3$ for example. Thus the correct trail angle is introduced for all such heights and for all air speed settings. Below 2,500 feet the line P1—P2—P3 will follow the chain dotted curve shown to the trail point O, which is zero height. It will be understood that Figure 11 is an exaggerated diagram and is not to scale.

To permit the pivoting of the altitude bar at the false trail point a universal mounting is provided (Figures 6, 7 and 8) in which the pivotal connection 32 of the altitude bar is carried on another pivotal mounting 80 at right-angles to the first and having a base 81 mounted on the bomb sight. Alternatively, as shown in Figures 9 and 10, the altitude bar is rotatably mounted at 82 in a bridge 83 which is pivoted on the axis 32 of the universal joint, the bridge 93 can be retained in either an upright or horizontal position by means of spring links, one of which is indicated at 84 pivotally connected at one end to a lug 85 on the bridge 83 and at the other end on the bomb sight frame 26. In both of these constructions of mounting for the altitude bar the bar may, when desired, be independently swung in a fore and aft plane into a horizontal position for facilitating transport or for safety or other purposes; thus, the links 84 operate on each side of a dead centre position to yieldingly retain the altitude bar in the desired upright or horizontal position. In an alternative arrangement, instead of pivoting the altitude bar at the false trail point, it may be so constructed that the back sight, when adjusted for height, moves along an axis inclined to the axis of the altitude bar.

Referring more especially to Figures 1, 12, 13, 14 and 15, in order to provide for the vector quantity of target speed, that is, the speed of the target relative to the ground, there is provided a target speed slide 86 engaging with the altitude bar 33 above its pivotal mounting and a second lower slide 96 which carries the base of the altitude bar. The drift bar 29 is connected by means of a bush 87 to the base 81 of the universal mounting for the altitude bar previously referred to, which bush is rotatable in the slide 96 about the axis 32.

The slide 86 is mounted on guide bars 88 and 89 on an upper ring 90. The lower slide 96 is movable along guides 91 and 92 (Fig. 15) carried by a lower ring 93. The ring 93 is rotatably mounted in a lower frame 94 on the bomb sight frame and the upper ring 90 is pivotally mounted at 97, 98 about a transverse axis at or near the trail point in an upper frame 99. The lower ring 93 carries upstanding tongue 100 which engages between two lugs 101 on the upper ring 90 so that the upper ring is constrained to rotate with the lower ring but is tiltable with respect to the lower ring about its pivotal mounting 97, 98. The lower ring 93 is rotated by means of a handle 102 (Fig. 15) which through bevel gearing 103 drives a pinion 104 rotatably mounted on the bomb sight frame and meshing with gear teeth on the lower ring 93. The guide bar 89 has a screw-threaded part 105 engaging in a nut 106 forming part of the upper slide 86, this guide bar being rotatable by means of a handle 107 for adjusting the slide 86 according to target speed.

When the target speed slide 86 and the altitude bar 33 are at the centre of the rings 90 and 93, zero target speed is set and the altitude bar coincides with the axis 32 and the zero position on the air speed bar 25 or has a fixed relation thereto as described with respect to Figure 11. Distances radially from the axis 32 measure target speed and are set with reference to a target speed scale on the guide bar 88.

Figure 12:
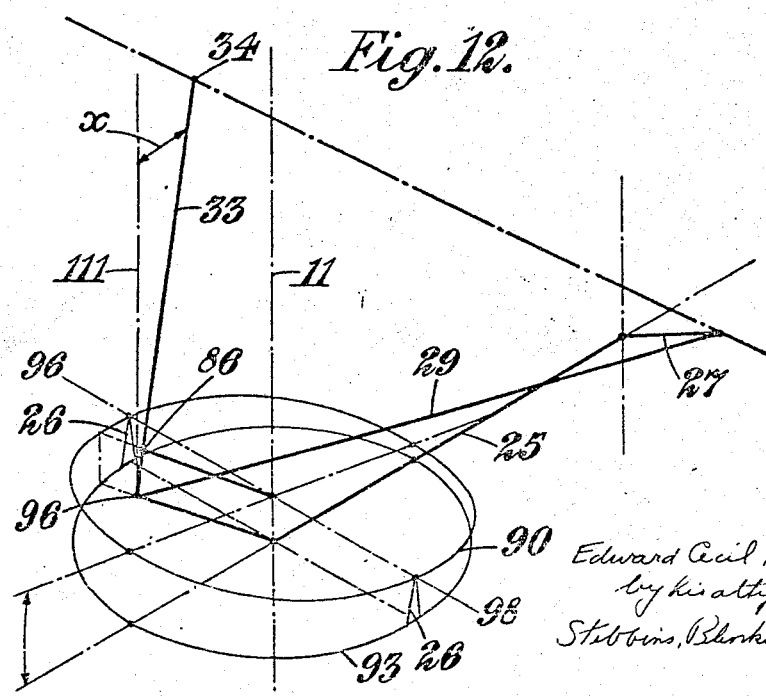
Figure 12 is a diagrammatic perspective view showing the vector elements and general geometry of the bomb sight, including the target speed vector.

When the upper ring 90 is tilted (see Figures 3 and 5) in the fore and aft plane, the altitude bar 33 is tilted therewith and correction is obtained for trail angle $x$ (Figure 12). This tilting of the altitude bar may be effected automatically by means of the mechanism adjusting for trail angle as previously described with reference to Figure 1.

Figure 15:
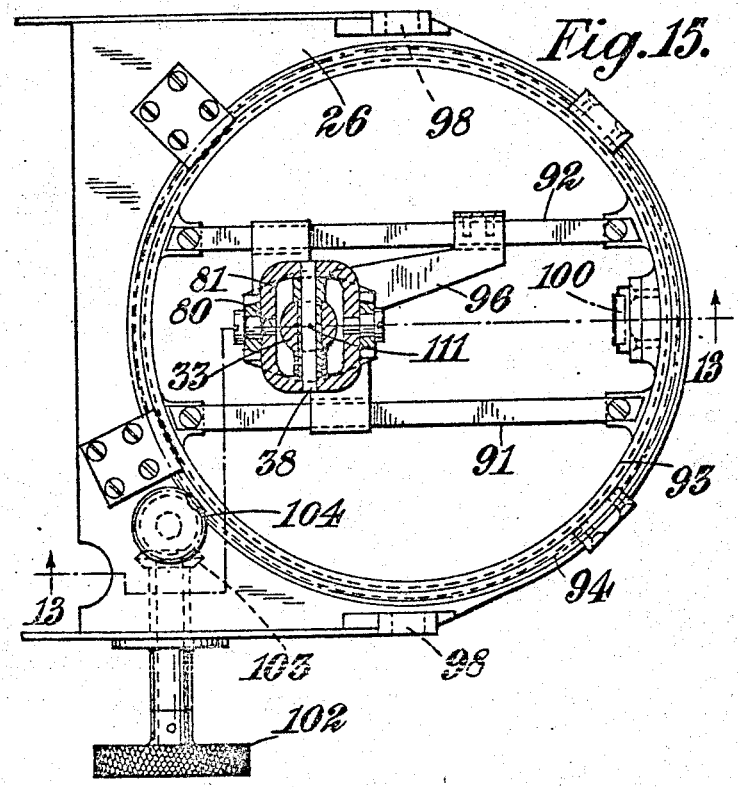
Figure 15 is a section on line 15—15 of Figure 13.

The upper ring 90 carries two target motion direction wires 108 arranged parallel to the guide bars 88 and 89 and provided with arrows indicating the direction of motion. When using the bomb sight these wires are set in the proper sense and parallel to the target wash or the like to align the target speed slide parallel to the direction of motion of the target. When the slides 86 and 96 are at the centre of the upper and lower rings respectively the device is set for zero target speed. For adjustment to target speed the slide 86 is adjusted radially from the axis 32 to a position, say, represented by the vertical axis 111 as indicated in Figures 12 and 15.

Figure 16:
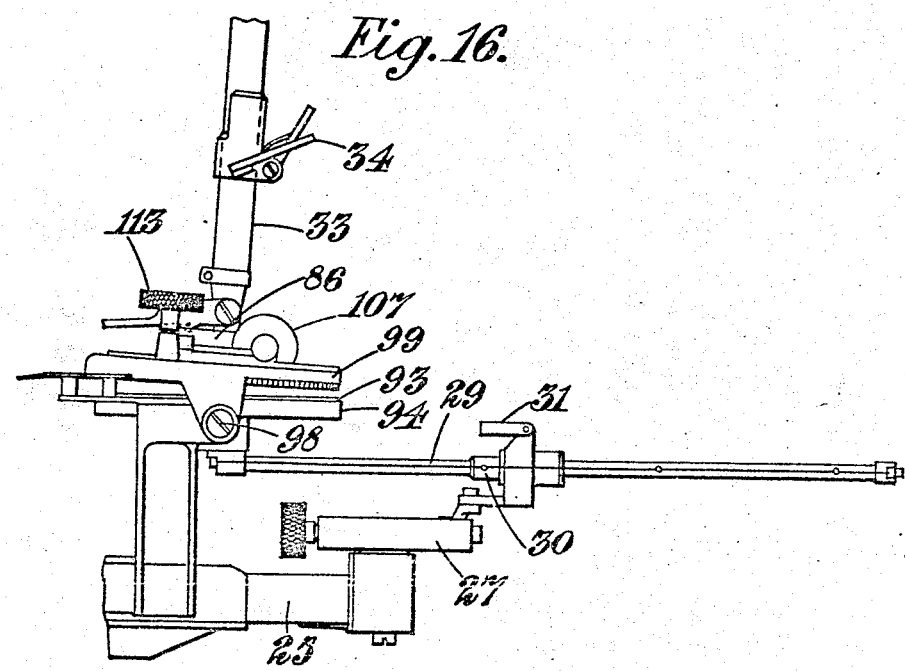
Figures 16 and 17 show in elevation and plan respectively a modified construction of the bomb sight.
Figure 17:
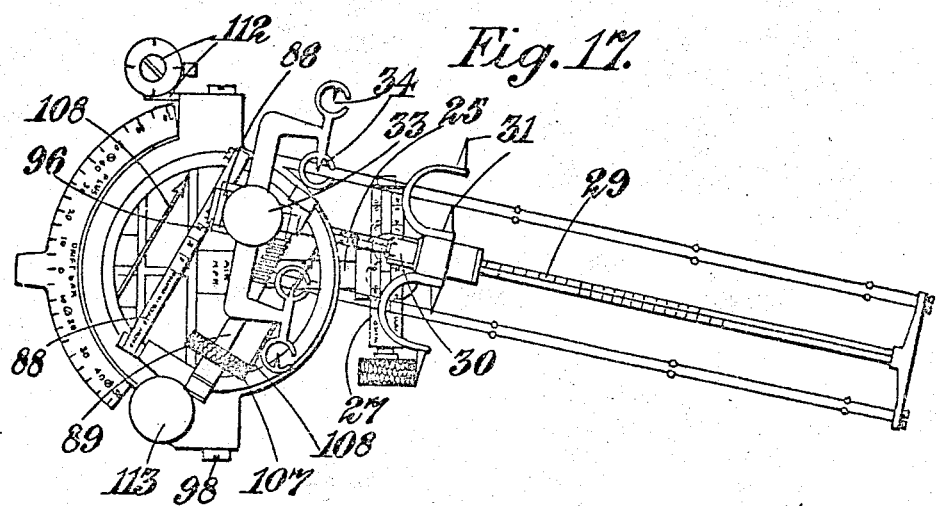

In the modified construction of bomb sight shown in Figures 16 and 17 the upper frame 99 is tilted to provide a correction for trail angle by means of a screw and nut gear 112 coacting between a crank on the upper frame 99 and a nut anchored on the bomb sight frame. In this construction a rotatable handle 113 corresponding to the handle 102 is arranged to drive directly a pinion meshing with the teeth provided on the lower ring 93, whereby the target motion direction wires 108 may be brought parallel to the target wash as above described.

Referring more especially to Figures 2 and 19 to 22, the compass bowl is housed in a casing 114 fast on a vertical spindle 115 (Figure 2) rotatably mounted in the bomb sight frame 26 and carrying a bevel gear wheel 116. The spindle 28 of the mounting of the wind bar 27 is connected through bevel gearing 117 to a spindle 118 passing through the air speed bar 25 which is tubular for this purpose. This spindle 118 has a splined end 119 carrying a bevel gear 120 in mesh with the bevel gear 116 so that the compass bowl casing is rotated according to the angular adjustment of the bar.

The bearing plate in the form of a verge ring 121 with a glass cover 122 is formed with a depending hub 123 which is screwed into the upper end of a sleeve 124 which surrounds and is rotatable on the compass bowl casing 114. The hub 123 is connected to the sleeve 124 by means of an interrupted screw thread 125 and is locked against rotation with respect to the sleeve by means of a spring detent 126 which engages a recess 127 in a flange at the top of the sleeve 124.

The sleeve 124 is prevented from axial movement on the compass bowl casing by means of coacting stops or flanges on these parts. The sleeve carries a tooth rim 128 and the compass bowl casing carries a tooth rim 129, these rims being of the same diameter. A pinion 130 loose on a shaft 131 meshes with the tooth rim 128 and another pinion 132 fixed on the shaft 131 meshes with the tooth rim 129. The shaft 131 is rotatable in bearings 133 and 134 in the bomb sight frame and is parallel to the axis of rotation of the compass bowl.

The pinion 130 rotates with one set of members 135 of a multi-disc clutch of which the other set of intermediate members indicated at 136 rotate with the shaft 131. The clutch members which are shown in Figures 21 and 22, are located between the upper surface of the pinion 130 and a collar 137 slidable on a square portion 138 of the shaft 131 which passes through complementary holes in the clutch members 135 so that these clutch members rotate with the shaft.

The collar 137 is normally pressed down on the clutch members by means of a helical spring 139 and an eccentric roller 140 carried on a transverse spindle 141 engages with the collar so that by rotation of the spindle 141 by means of a thumb lever 142 the collar 137 may be raised against the action of the spring 139 to disengage the clutch. The eccentric roller 140 is arranged so that its extreme positions lie on opposite sides of the dead centre position and in the extreme positions of the thumb lever it rests on either of stops 143 and 144, so that the clutch remains in the engaged or disengaged position to which it is set.

A friction brake may be provided to aid in preventing displacement of the setting of the pinion 132 owing to vibration. This brake consists of a friction disc 145 on a cage 146 and pressed into engagement with the pinion 132 by a spring 147, the cage being prevented from rotation by guide pins 148 engaging in axial slots in the cage.

The bomb sight frame is preferably constructed as a casing to enclose the sleeve 124 and the gearing just described, the sleeve projecting through an aperture 149 at the top of the casing. The shaft 131 extends through the top of the casing and is provided with a handle 150. With this arrangement the size of the pinions in relation to the tooth rims 128 and 129 is such that a slow motion drive is imparted to the compass bowl casing and bearing plate. A tooth or other positive clutch may be employed instead of a friction clutch and the clutch may be associated with the compass bowl casing instead of with the bearing plate.

I claim:

1. A bomb sight comprising interconnected relatively adjustable members simulating to scale the triangle representing the vector quantities of air speed, wind speed and ground speed, sighting means positioned by said adjustable members and means automatically to change the position of the sighting means to allow for the trail angle of a bomb by the adjustment of the effective length of the air speed member for air speed.

2. A bomb sight comprising interconnected relatively adjustable members simulating to scale the triangle representing the vector quantities of air speed, wind speed and ground speed, sighting means positioned by said adjustable members, means automatically to change the position of the sighting means to allow for the trail angle of a bomb by the adjustment of the effective length of the air speed member for air speed, and means controlling the trail angle adjusting means to increase or decrease the amount of adjustment in accordance with the terminal velocities of different bombs.

3. A bomb sight comprising interconnected relatively adjustable members simulating to scale the triangle representing the vector quantities of air speed, wind speed and ground speed, an upstanding altitude member, a back sight on said altitude member, a fore sight and means automatically to tilt said altitude member by the adjustment of the effective length of the air speed member to correct the sight line of said sights for the trail angle of a bomb.

4. A bomb sight comprising interconnected relatively adjustable members simulating to scale the triangle representing the vector quantities of air speed, wind speed and ground speed, sighting means positioned by said adjustable members and means automatically to change the position of the sighting means to allow for the trail angle of a bomb by the adjustment of the air speed member for air speed, a hand wheel for adjusting the said air speed member and a friction brake releasable by the hand wheel for normally locking the air speed member in the adjusted position.

5. A bomb sight comprising interconnected relatively adjustable members simulating to scale the triangle representing the vector quantities of air speed, wind speed and ground speed, an upstanding altitude member, a back sight on said altitude member, a fore sight and a coupling between the altitude member and the air speed member such that the altitude member is automatically moved according to a function correlating trail angle and air speed thus changing the position of the back sight and correcting the sighting line through said sights, by the adjustment of the air speed member, and means to vary the coupling in order to correct the sighting line for bombs of different terminal velocities.

6. A bomb sight comprising interconnected relatively adjustable members simulating to scale the triangle representing the vector quantities of air speed, wind speed and ground speed, an upstanding altitude member, a back sight on said altitude member, a fore sight, which altitude member is pivotally mounted on the bomb sight at a point spaced away from the origin or trail point of the bomb sight, and means automatically to apply to change the height of the back sight relative to the fore sight by the adjustment of the air speed member.

7. A bomb sight comprising interconnected relatively adjustable members simulating to scale the triangle representing the vector quantities of air speed, wind speed and ground speed, an upstanding altitude member, a back sight on said altitude member, a fore sight, means automatically to change the height of the back sight relative to the fore sight by the adjustment of the air speed member, which altitude member is so shaped that the back sight, when adjusted for height, moves along an axis inclined to the axis of the altitude member.

8. A bomb sight comprising interconnected relatively adjustable members simulating to scale the triangle representing the vector quantities of air speed, wind speed and ground speed, sighting means positioned by said adjustable members and means automatically to change the position of the sighting means to allow for the trail angle of a bomb by the adjustment of the air speed member for air speed, and an additional adjustable member co-related with the others and representing target speed.

9. A bomb sight comprising interconnected relatively adjustable members simulating to scale the vector diagram representing the vector quantities of air speed, wind speed, ground speed and target speed, which target speed member is pivotally mounted on the adjustable member on which ground speed is represented, and sights positioned on and movable by adjustment of said members.

10. A bomb sight comprising interconnected relatively adjustable members simulating to scale the vector diagram representing the vector quantities of air speed, wind speed and ground speed, an upstanding altitude member, a back sight on said altitude member, and a fore sight, which altitude member is coupled to the ground speed member so as to be rotatable therewith about a vertical axis which is laterally movable relative to the ground speed member for correction for target speed.

11. A bomb sight comprising interconnected relatively adjustable members simulating to scale the triangle representing the vector quantities of air speed, wind speed and ground speed, an upstanding altitude member, a back sight on said altitude member, and a fore sight mounted on the ground speed member, which altitude member is coupled to the ground speed member so as to be rotatable therewith about a vertical axis which is laterally movable relative to the ground speed member for correction for target speed, and is furthermore mounted for pivotal movement in the vertical plane of the ground speed member.

12. A bomb sight comprising interconnected relatively adjustable members simulating to scale the vector diagram representing the vector quantities of air speed, wind speed, ground speed and target speed, an upstanding altitude member, a slider movable along said target speed member and carrying said altitude member rotatable about a vertical axis thereon, a back sight on said altitude member and a fore sight on said ground speed member.

13. A bomb sight comprising interconnected relatively adjustable members simulating to scale the triangle representing the vector quantities of air speed, wind speed, drift and target speed, which target speed member comprises upper and lower parts, said upper part being tiltable about a normally horizontal axis with respect to said lower part, an upstanding altitude member, a slider carrying said altitude member, said slider comprising two parts movable respectively along said upper and lower parts of the target speed member, a back sight on said altitude member and a fore sight on said drift member.

14. A bomb sight comprising interconnected relatively adjustable members simulating to scale the triangle representing the vector quantities of air speed, wind speed, drift and target speed, which target speed member comprises upper and lower parts, which upper and lower parts are interconnected for joint rotation, a tiltable frame carrying said upper part for tilting said upper part about a normally horizontal axis in relation to said lower part, an upstanding altitude member, a slider carrying said altitude member, said slider comprising two parts movable respectively on said upper and lower parts of the target speed member, a back sight on said altitude member and a fore sight on said drift member.

15. A bomb sight comprising a bomb sight frame, an air speed member adjustable in said frame, a wind speed member pivoted on said air speed member, a drift member pivoted to and slidable on said wind speed member, a lower rotatable member on the bomb sight frame, means for rotating said lower rotatable member according to the direction of target movement, a lower guide on said rotatable member, a lower slider movable along said lower guide, said air speed member being pivotally mounted in said lower slide, an upstanding altitude member, a universal joint connecting said altitude member to said drift member, an upper rotatable member, an upper guide thereon, an upper slide movable on said upper guide, in which upper slide said altitude member is rotatable, means for adjusting said upper slide on the upper guide according to target speed, means coupling the rotatable members for joint rotation, said upper rotatable member being mounted in a tiltable frame, a back sight adjustable on said altitude member, a fore sight, and means automatically to tilt said frame by the adjustment of said air speed member for air speed in order to apply a correction of the sighting line through said sights for trail angle.

16. A bomb sight comprising a compass having its bowl mounted to rotate about a vertical axis, a wind member geared to the bowl, a bearing plate rotatable at the top of the bowl, a toothed gear secured to the bowl, a pinion fast on a rotatable adjusting shaft and meshing with the toothed gear, a second toothed gear secured to the bearing plate, a second pinion connected to the adjusting shaft by a disengageable clutch and meshing with the second toothed gear.

17. A bomb sight comprising relatively adjustable members simulating to scale the triangle representing the vector quantities of air speed, wind speed and ground speed, an upstanding altitude members, a back sight on said altitude member, a fore sight, which altitude member is pivotally mounted on the bomb sight at a point spaced away from the origin or trail point of the bomb sight, said pivotal point corresponding in scale to the point of intersection of straight lines on a graph on which known trail angles have been plotted from varying air speeds and altitudes, said straight lines passing through points on the graph where lines representing trail angles, air speeds and altitudes intersect, and means automatically to change the height of the back sight relative to the fore sight by the adjustment of the air speed member.

18. A bomb sight comprising interconnected relatively adjustable members simulating to scale the vector diagram representing the vector quantities of air speed, wind speed, ground speed and target speed, which target speed member is pivoted to the ground speed member at a point thereon variably spaced from the connection of the wind member to the ground speed member, and sights positioned on and moved by adjustment of said members.

19. A bomb sight comprising interconnected relatively adjustable members simulating to scale the triangle representing the vector quantities of air speed, wind speed and ground speed, an upstanding altitude member, a back sight on said altitude member, and a fore sight on said ground speed member, and a universal joint which couples the altitude member to the drift member.

EDWARD CECIL HORSLEY.